United States Patent [19]

Kubota

[11] Patent Number: 5,093,838
[45] Date of Patent: Mar. 3, 1992

[54] LASER APPARATUS

[75] Inventor: Shigeo Kubota, Tokyo, Japan

[73] Assignee: Sony Corporation, Tokyo, Japan

[21] Appl. No.: 703,752

[22] Filed: May 21, 1991

[30] Foreign Application Priority Data

May 23, 1990 [JP] Japan .................. 2-133230

[51] Int. Cl.⁵ .............................. H01S 3/08
[52] U.S. Cl. .................... 372/107; 372/108; 372/101; 372/92
[58] Field of Search .............. 372/68, 107, 108, 101, 372/92

[56] References Cited

U.S. PATENT DOCUMENTS 4,672,626  6/1987  Koseki .................. 372/107
4,772,121  9/1988  Trageser .............. 372/107

Primary Examiner—Léon Scott, Jr.
Attorney, Agent, or Firm—Lewis H. Eslinger; Jay H. Maioli

[57] ABSTRACT

A laser apparatus includes first and second laser rods disposed at both sides of a center point on an optical axis, respectively, first and second concave lenses, for compensating the first and second thermal lenses, disposed at positions which are both sides of the center point on the optical axis and inner sides of the first and second laser rods, respectively, first and second reflection mirrors disposed at positions which are both sides of the center point on the optical axis and outer sides of the first and second laser rods, respectively, a first supporting unit for supporting the first laser rod and the second concave lens such that a distance therebetween on the optical axis is kept to be a constant value, and a second supporting unit for supporting the second laser rod and the first concave lens such that a distance therebetween on the optical axis is kept to be a constant value, wherein the first and second supporting units are relatively movable on the optical axis.

3 Claims, 2 Drawing Sheets

LASER APPARATUS

BACKGROUND OF THE INVENTION

1. Field of the Invention

The present invention generally relates to a laser apparatus and more particularly to a laser apparatus wherein end faces of the laser medium disposed between a pair of reflection mirrors are excited by a pumping light beam applied from a laser light source such as a semiconductor laser element or the like to thereby oscillate and radiate a laser light.

2. Description of the Prior Art

There is known in the art a solid state laser apparatus which is so constructed that a laser rod or laser medium made of Nd:YAG etc. is disposed between a pair of reflection mirrors and the end faces of the laser rods are excited by a pumping light beam applied from a laser light source such as a semiconductor laser element to thereby oscillate and radiate a laser light.

However, in this conventional solid state laser apparatus, a thermal lens is formed in the laser rod since the rod is heated by the pumping light beam, so that conventionally it has been intended to compensate for the thermal lens by providing a concave lens.

A focal length of the thermal lens, however, changes depending on the change of an amount of light of the pumping light beam for exciting the laser rod, so that it has been required to compensate for the thermal lens formed in the laser rod by selecting a concave lens for the compensation of the thermal lens having a suitable focal length depending on that of the thermal lens and further by adjusting relative position of the compensation concave lens or reflection mirrors with respect to the laser rod on an optical axis.

Thus, the conventional solid state laser apparatus has required, in order to compensate for the thermal lens formed in the laser rod, the selection of a concave lens for the compensation of the thermal lens having a suitable focal length depending on that of the thermal lens and further the adjustment of the relative position of the compensation concave lens or reflection mirrors with respect to the laser rod on the optical axis.

OBJECTS AND SUMMARY OF THE INVENTION

Accordingly, it is a general object of the present invention to provide an improved laser apparatus in which the aforementioned shortcomings and disadvantages of the prior art can be eliminated.

More specifically, it is an object of the present invention to provide an improved laser apparatus which is capable of easily adjusting the positions of optical elements in order to compensate for the thermal lens formed in the laser rod.

According to an aspect of the present invention, a laser apparatus to comprise first and second laser rods disposed at both sides of a center point on an optical axis, respectively, first and second concave lenses, for compensating the first and second thermal lenses, disposed at positions which are on both sides of the center point on the optical axis and on inner sides of the first and second laser rods, respectively, first and second reflection mirrors disposed at positions which are both sides of the center point on the optical axis and outer sides of the first and second laser rods, respectively, a first supporting unit for maintaining a distance on the optical axis between the first laser rod and the second concave lens to be a constant value, and a second supporting unit for maintaining a distance on the optical axis between the second laser rod and the first concave lens to a constant value, wherein the first and second supporting units are relatively movable on the optical axis.

The above and other objects, features, and advantages of the present invention will become apparent from the following detailed description of an illustrative embodiment thereof to be read in conjunction with the accompanying drawings, in which like reference numerals represent the same or similar elements.

DETAILED DESCRIPTION OF THE PREFERRED EMBODIMENT

Figure 1:
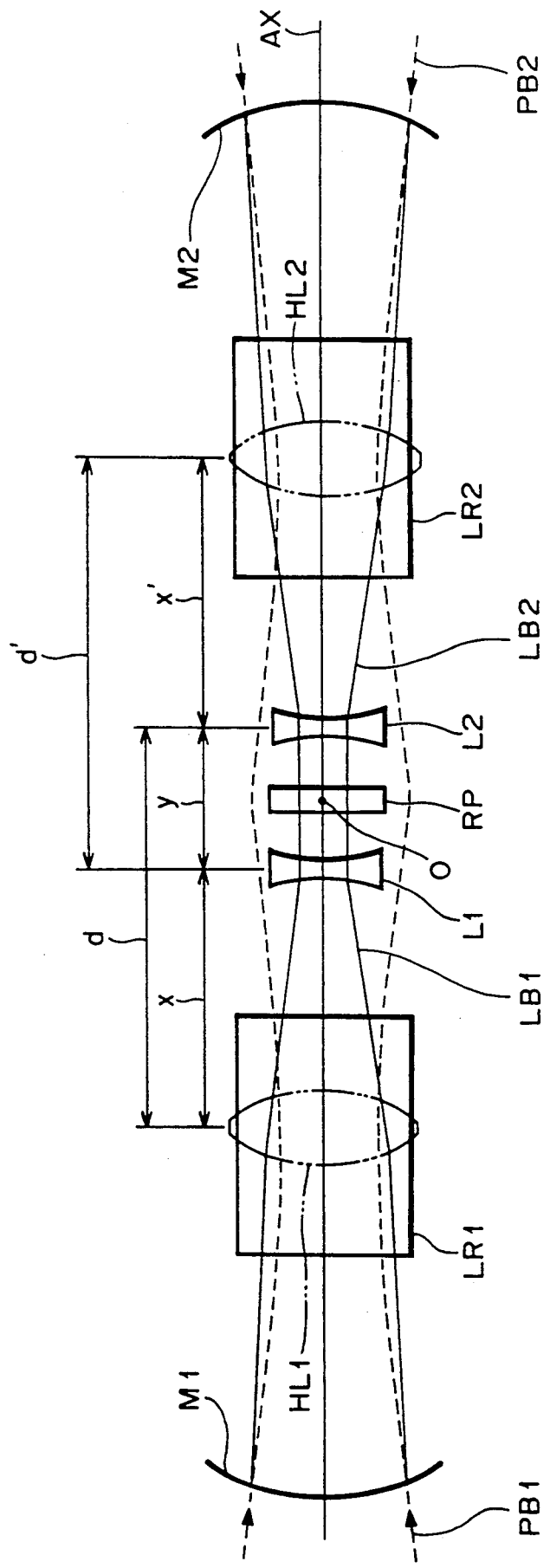
FIG. 1 is a diagram illustrating constructions of an optical system of a laser apparatus according to an embodiment of the present invention.

A preferred embodiment of the present invention will now be described with reference to the accompanying drawings, wherein like reference numerals denote like or corresponding elements throughout the drawings.

Referring now to FIG. 1 which illustrates constructions of an optical system of a preferred embodiment of the laser apparatus according to the present invention, first and second laser rods LR1 and LR2 made of Nd:YAG are disposed on an optical axis AX at both sides of its center point 0, first and second concave lenses L1 and L2 having focal lengths of Fc and Fc' respectively for compensating thermal lens are disposed at positions which are on both sides of the center point 0 of the optical axis AX and on inner sides of the first and second laser rods LR1 and LR2 respectively, and first and second reflection mirrors (concave mirrors or dichroic mirrors) M1 and M2 are disposed at positions which are on both sides of the center point 0 of the optical axis AX and on outer sides of the first and second laser rods LR1 and LR2 respectively. These optical elements LR1, LR2, L1, L2, M1 and M2 compose a laser resonator. Now, focal lengths of thermal lenses HL1 and HL2 respectively formed in the first and second laser rods LR1 and LR2 are Fa and Fa', respectively.

The first and second laser rods LR1 and LR2 are excited by first and second pumping light beams PB1 and PB2, which are respectively laser beams with a wave length of 808 nm emitted from laser diodes (not shown), applied at the end sides of the laser rods LR1 and LR2 from outer sides of the first and second concave mirrors M1 and M2 through the mirrors M1 and M2 to thereby generate first and second laser beams LB1 and LB2 of a wave length of 1064 nm, respectively. The first and second laser beams LB1 and LB2 are repeatedly reflected between the first and second concave mirrors M1 and M2 to oscillate a laser beam.

Figure 2:
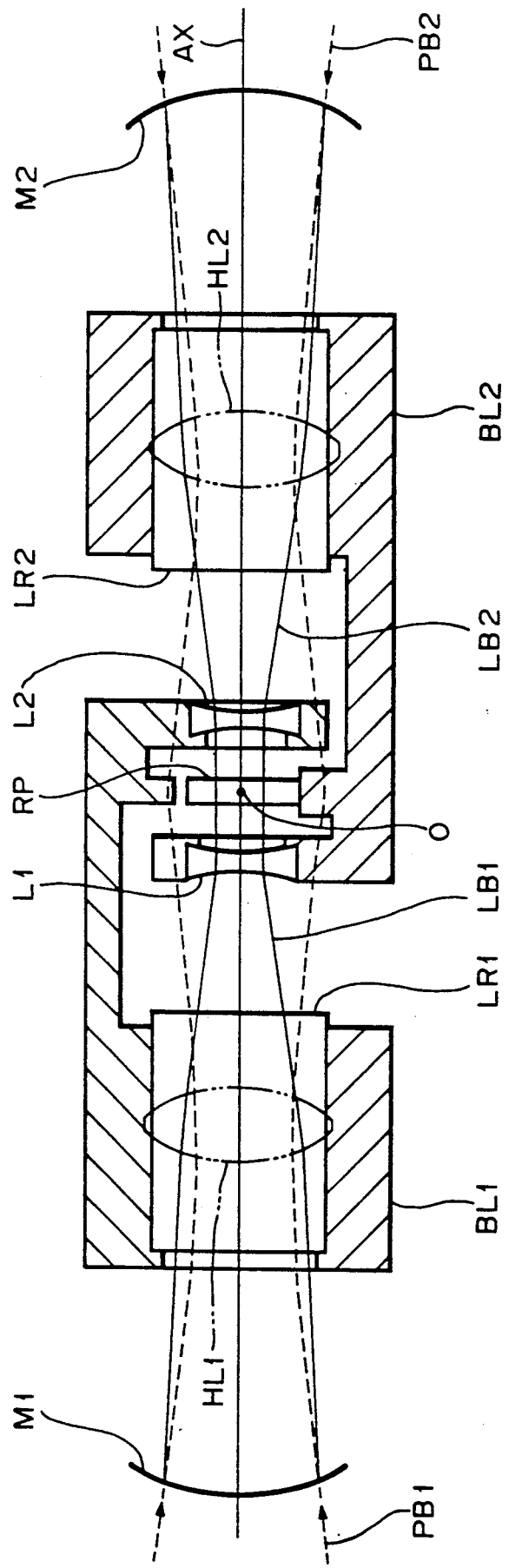
FIG. 2 is a diagram illustrating constructions of a supporting system of the lens system of the laser apparatus of the embodiment.

Further, the solid state laser apparatus of this embodiment has, as shown in FIG. 2, a first supporting unit (a first block of substantially cylindrical configuration) BL1 for maintaining a distance on the optical axis AX between the first laser rod LR1 supported by a first portion of the block BL1 and the second concave lens L2 supported by a second portion of the block BL1 to a constant value, and a second supporting unit (a second block of substantially cylindrical configuration with diameter substantially the same as the first block BL1) BL2 for maintaining a distance on the optical axis AX between the second laser rod LR2 supported by a third portion of the block BL1 and the first concave lens L1 supported by a fourth portion of the block BL1 to a constant value. A piezoelectric element is provided at an outer end(s) of one of or both the first and second supporting units BL1 and BL2. The first and second supporting units BL1 and BL2 are guided by a linear groove (not shown) with a cross section of V-shape and movable along the optical axis AX on the groove, whereby the thermal lenses HL1 and HL2 formed in the laser rods LR1 and LR2 can be compensated for by the first and second concave lenses L1 and L2 by suitably moving the first and second supporting units.

The solid state laser apparatus of this embodiment further includes, as shown in FIG. 1, a quartz rotator element (or optically active element) RP disposed at the center point 0 on the optical axis AX such that thermal birefringence of the same amount generated in the first and second laser rods LR1 and LR2 is compensated for by optically rotating the retardation by 90° when the focal lengths Fa and Fa' of the thermal lenses HL1 and HL2 formed in the first and second laser rods LR1 and LR2 are equal to each other.

Now, as shown in FIG. 1, it is supposed that, on the optical axis AX, a distance between the thermal lens HL1 formed in the first laser rod LR1, which seems to be positioned at the center position of the first laser rod LR1 on the optical axis AX, and the first concave lens L1 is taken as x, a distance between the thermal lens HL2 formed in the second laser rod LR2, which seems to be positioned at the center position of the second laser rod LR2 on the optical axis AX, and the second concave lens L2 is taken as x', and a distance between the first and second concave lenses L1 and L2 is taken as y. In this case, a distance d between the thermal lens HL1 formed in the first laser rod LR1 and the second concave lens L2 is $$d = x + y$$

The distance d is fixed by the first block BL1. Also, a distance d' between the thermal lens HL2 formed in the second laser rod LR2 and the first concave lens L1 is $$d' = x' + y$$

The distance d' is fixed by the second block BL2.

Now, assuming that the focal lengths Fa and Fa' of the thermal lenses HL1 and HL2 formed in the first and second laser rods LR1 and LR2 are equal to each other and the above described distances d and d' are equal to each other, then the distance y between the first and second concave lenses L1 and L2 changes when the first and second supporting units BL1 and BL2 are relatively moved to each other along the optical axis AX. However, when the distance y between the first and second concave lenses L1 and L2 is adjusted in such a manner that the distance x between the thermal lens HL1 of the first laser rod LR1 and the first concave lens L1 becomes $x = d - y = Fa + Fc$, if a parallel beam LB1 is radiated on the thermal lens HL1 of the first laser rod LR1 from the first concave mirror M1 side, the parallel beam LB1 is converged by the thermal lens HL1 so as to be focused at the focal position thereof and the converged beam LB1 is converted into a parallel laser beam by the first concave lens L1 in accordance with the above-described relation of $x = d - y = Fa + Fc$ when it is radiated into the first concave lens L1. Also, when a parallel beam LB2 is radiated in the thermal lens HL2 of the second laser rod LR2 from the second concave mirror M2 side, the parallel beam LB2 is converged by the thermal lens HL2 so as to be focused at the focal position thereof and the converged beam LB2 is converted into a parallel laser beam by the second concave lens L2 in accordance with a relation of $x' = d' - y = d - y = Fa + Fc$ when it is radiated into the second concave lens L2. Thus, the optical paths on both sides of the center point 0 on the optical axis AX become symmetrical with respect to the center point 0.

Similarly, even if the laser beams LB1 and LB2 respectively radiated into the thermal lenses HL1 and HL2 of the first and second laser rods LR1 and LR2 are both converged laser beams or divergent laser beams, these laser beams LB1 and LB2 can be converted into parallel laser beams after passing through the thermal lenses HL1 and HL2 of the first and second laser rods LR1 and LR2 and the first and second concave lenses L1 and L2, respectively, by adjusting the distance y between the first and second concave lenses L1 and L2 by using the similar principle.

Therefore, according to the present invention as described above, the first and second laser rods are disposed at both sides of the center point on the optical axis, the first and second concave lenses for compensating the thermal lenses are disposed at positions which are on both sides of the center point on the optical axis and on the inner sides of the first and second laser rods respectively, the first and second reflection mirrors are disposed at positions which are on both sides of the center point on the optical axis and on the outer sides of the first and second laser rods respectively, a distance on the optical axis between the first laser rod and the second concave lens is fixed by the first supporting unit, a distance on the optical axis between the second laser rod and the first concave lens is fixed by the second supporting unit, and the first and second supporting units are arranged to be relatively movable on the optical axis, so that the positions of the optical elements on the optical axis can be easily adjusted in order to compensate the thermal lenses even when degrees of the thermal lens effects of the laser rods have changed.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

We claim as our invention:

1. A laser apparatus comprising:
   first and second laser rods disposed at both sides of a center point on an optical axis, respectively;
   first and second concave lenses, for compensating said first and second thermal lenses, disposed at positions which are on both sides of the center point on the optical axis and on inner sides of said first and second laser rods, respectively;
   first and second reflection mirrors disposed at positions which are on both sides of the center point on the optical axis and on outer sides of said first and second laser rods, respectively;

first supporting means for supporting said first laser rod and said second concave lens such that a distance therebetween on the optical axis is kept to be a constant value; and second supporting means for supporting said second laser rod and said first concave lens such that a distance therebetween on the optical axis is kept to be a constant value, wherein said first and second supporting means are relatively movable on the optical axis.

2. A laser apparatus according to claim 1, further comprising rotary polarization means disposed at the center point on the optical axis for compensating for thermal birefringence generated in the first and second laser rods.

3. A laser apparatus according to claim 1, wherein said first supporting means has a first portion supporting said first laser rod and at a second portion supporting said second concave lens, said second supporting means has a third portion supporting said second laser rod and a fourth portion supporting said first concave lens, and said first and second supporting means are relatively movable on the optical axis in a manner such that an optical path passing from said first reflection mirror to the center point on the optical axis through said first laser rod and said first concave lens and an optical path passing from said second reflection mirror to the center point on the optical axis through said second laser rod and said second concave lens are symmetrical with respect to the center point on the optical axis.

* * * * *